Nov. 8, 1932.                C. LORBER                1,887,160
                             TRACING CHART
                     Filed Dec. 22, 1931        2 Sheets-Sheet 1
Fig. 1.                                                  Fig. 2.
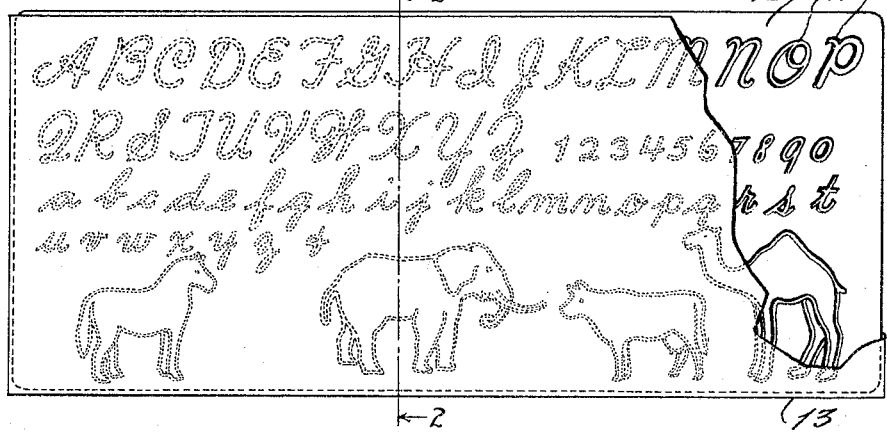
Fig. 3.
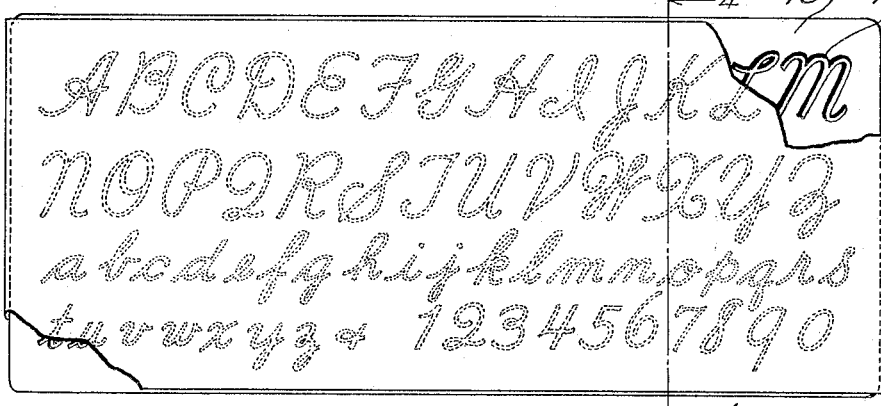
Fig. 4.
Fig. 5.
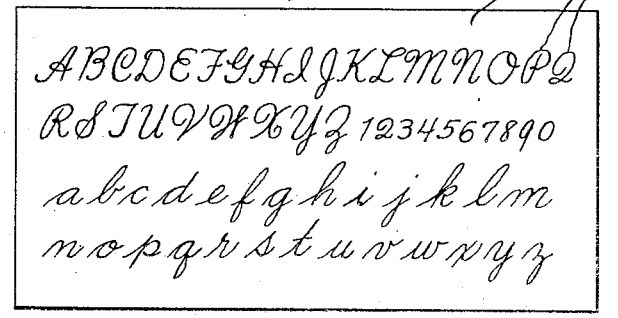
Inventor
Charles Lorber
By  J. Clarkson
      Attorney

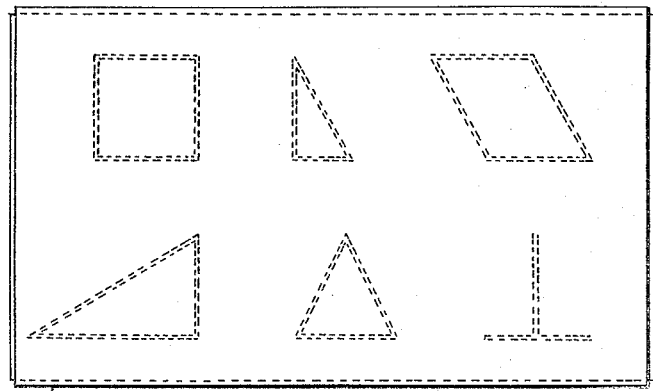
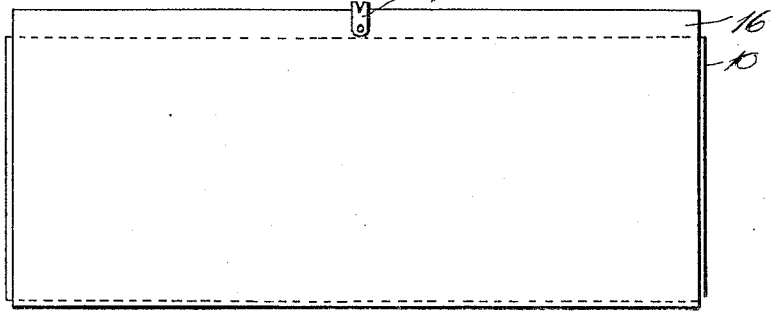
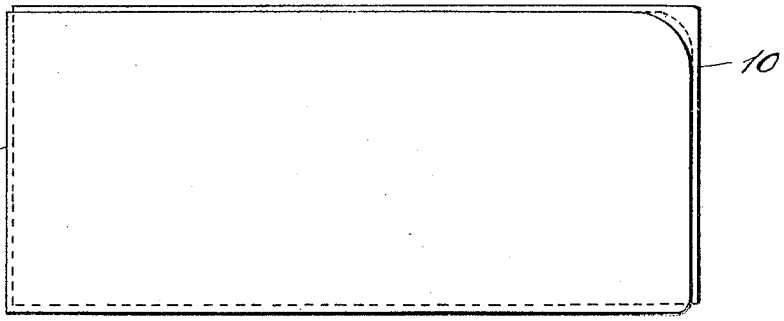
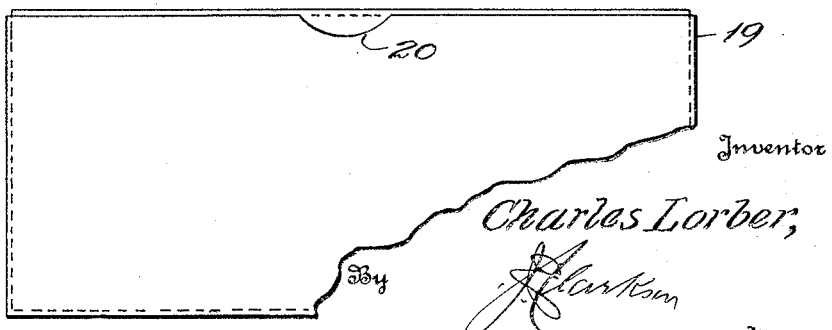

Patented Nov. 8, 1932

1,887,160

UNITED STATES PATENT OFFICE

CHARLES LORBER, OF LOUISVILLE, KENTUCKY

TRACING CHART

Application filed December 22, 1931. Serial No. 582,625.

This invention relates to educational devices and has special reference to a tracing chart.

In the form of tracing chart shown in my copending application filed August 12, 1931 and bearing the Serial Number 556,689 a tracing chart is shown wherein the tracing paper is held on the body of the chart by certain clips.

I have found, in certain instances, that it is highly advantageous to hold the chart body and the tracing paper in correct relative positions without the use of such clips.

One important object of the present invention, therefore, is to provide a novel combination of tracing chart and tracing paper so arranged that, without the use of any clips, the chart will be properly positioned in relation to the paper.

A second important object of the invention is to so arrange the tracing paper that it may form an envelope for the chart proper at the same time permitting both sides of the envelope to be used.

A third important object of the invention is to provide a device of this kind wherein the chart proper may be shifted in the envelope so that the same part of the chart may be retraced a number of times and thus practice obtained in forming, for instance, a particular letter.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front elevation, partly broken away, of one form of the invention.

Figure 2 is an enlarged section on the line 2—2 of Figure 1.

Figure 3 is a view similar to Figure 1 showing a second form of the invention.

Figure 4 is a section on the line 4—4 of Figure 1.

Figure 5 is a face view of a chart adapted for use by advanced pupils.

Figure 6 is a front view of a third form of the invention.

Figure 7 is an end view of the form shown in Figure 6.

Figure 8 is a face view of a fourth form of the invention.

Figure 9 is a face view of a fifth form of the invention.

Figure 10 is a face view of a sixth form of the invention.

In each of the forms herein illustrated there is provided a tracing chart proper 10 which consists of a sheet of suitable material such as cardboard or the like and this sheet has grooved characters 11 or simple printed characters 12 (see Figure 5) impressed or otherwise shown thereon. These characters may be of any desired kinds such as letters, numerals, figures of natural objects, geometric figures, or any others found desirable to the use of any particular figures or representations on the chart. It will also be presently apparent that any number of different charts may be used to make up an educational group or set.

In the form shown in Figures 1 and 2 there is provided an envelope 13 made throughout of tracing paper and this envelope is closed at the bottom and each end but is open at the top so as to permit the introduction and withdrawal of the chart 10. In this form the envelope fits the chart snugly and both the front and rear of the envelope are alike so that after one side has been used the envelope may be removed and replaced with the other side in front of the chart thus permitting that side to be used. In each of the modified forms herein shown this same reversal of the envelope for use of both back and front may be effected.

In the form shown in Figures 3 and 4 the envelope 14 is closed only at the ends. The chart 10 may therefore be slid vertically through the envelope so that the same character on the chart may be positioned in several positions on a vertical line for retracing so that the pupil may practice on the same character and thus attain proficiency in its formation.

In the form shown in Figures 6 and 7 the envelope 15 is closed at the top and bottom but open at the ends so that the chart 10 may be slid longitudinally therethrough and a character may be thus moved to successive positions along the same horizontal lines for repeated tracing as before.

The form shown in Figure 8 is much like that shown in Figure 6, but the envelope sheet 16 consists merely of a sheet of tracing paper doubled and having opposite edges brought together and held by an ordinary paper clip 17.

In the three forms of Figures 3, 6, and 8 it will be noted that the envelope is of flat tubular form open at each end of the tube and that the chart is slidable through the tube.

In Figure 9 the envelope 18 is closed at the bottom and one end and is open at the top and the other end.

In Figure 10 the arrangement of the envelope 19 is quite like that of Figure 1 except that a finger notch 20 is cut in the front upper edge to enable the chart to be more readily grasped.

In each of these forms the characters of the chart are traced on the tracing paper, the pupil progressing from simple characters to more difficult ones and at first using the grooved form of chart to guide the pencil in tracing after which the form of chart shown in Figure 5 is used.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with a tracing chart having characters to be traced shown thereon; of an envelope formed throughout of tracing paper snugly fitting said chart and open at at least one edge to permit insertion and withdrawal of the chart, said tracing paper being transparent to permit the characters on the chart to be plainly visible therethrough.

2. The combination with a tracing chart having characters to be traced shown thereon; of an envelope formed throughout of tracing paper snugly fitting said chart and open at two of its edges to permit insertion and withdrawal of the chart, said tracing paper being transparent to permit the characters on the chart to be plainly visible therethrough.

3. The combination with a tracing chart having characters to be traced shown thereon; of a flat tubular cover formed throughout of tracing paper and snugly fitting said chart and open at two opposite edges to permit the chart to slide therethrough, said tracing paper being transparent to permit the characters on the chart to be plainly visible therethrough.

4. The combination with a tracing chart having characters to be traced shown thereon; of a horizontally elongated flat tube formed throughout of tracing paper and snugly fitting said chart and open at its end edges to permit the chart to slide therethrough, said tracing paper being transparent to permit the characters on the chart to be plainly visible therethrough.

5. The combination with a tracing chart having characters thereon; of a horizontally elongated flat tube formed throughout of tracing paper and snugly fitting said chart and open at its edges to permit the chart to slide therethrough, said tube consisting of a single sheet of paper doubled to bring opposite edges of the sheet together, said edges being held together by a paper clip, said tracing paper being transparent to permit the characters on the chart to be plainly visible therethrough.

In testimony whereof I affix my signature.

CHARLES LORBER.